United States Patent [19]

Lepori et al.

[11] Patent Number: 5,318,736
[45] Date of Patent: Jun. 7, 1994

[54] BINDING COMPOSITIONS FOR THE MANUFACTURE OF LIGNOCELLULOSIC

[75] Inventors: Agostino Lepori, Fagnano Olona; Egidio Moroni, Castellanza, both of Italy

[73] Assignee: Ministro per il Coorinamento dell Iniziative per la Ricerca Scientifica e Technologica, Rome, Italy

[21] Appl. No.: 990,541

[22] Filed: Dec. 14, 1992

Related U.S. Application Data

[63] Continuation of Ser. No. 586,805, Sep. 24, 1990, abandoned.

[30] Foreign Application Priority Data

Sep. 25, 1989 [IT]  Italy ................................. 21819 A/89

[51] Int. Cl.$^5$ ...................... B01J 13/00; C08G 18/06; D04H 1/64
[52] U.S. Cl. ................................. 264/126; 106/287.25; 156/331.7; 252/312; 264/300; 528/905
[58] Field of Search ................... 252/312; 106/287.25; 156/331.7; 264/300, 126; 528/905

[56] References Cited

U.S. PATENT DOCUMENTS

| | | | |
|---|---|---|---|
| 3,428,592 | 2/1969 | Youker | 252/312 X |
| 3,839,413 | 10/1974 | Wolff et al. | 252/312 X |
| 3,925,527 | 12/1975 | Kleimann et al. | 264/300 X |
| 3,996,154 | 12/1976 | Johnson et al. | 252/312 |
| 4,143,014 | 3/1979 | McLaughlin et al. | 252/312 X |
| 4,258,169 | 3/1981 | Prather et al. | 264/300 X |
| 4,528,117 | 7/1985 | Scholl et al. | 252/312 |
| 4,576,771 | 3/1986 | Scholl et al. | 252/312 X |
| 4,609,511 | 9/1986 | Fischer et al. | 252/312 X |
| 5,019,317 | 5/1991 | Slocum et al. | 264/300 |

OTHER PUBLICATIONS

*Advanced Organic Chemistry: Reactions, Mechanisms and Structure*, Jerry March (Wiley-Interscience, 4th Ed. 1992), pp. 891–892.

*Organic Chemistry*, Robert T. Morrison & Robert N. Boyd (Allyn and Bacon, 3rd Ed. 1976) p. 1044.

*Primary Examiner*—Richard D. Lovering
*Attorney, Agent, or Firm*—Bryan Cave

[57] ABSTRACT

Binding compositions for the manufacture of lignocellulosic composites comprising an aqueous emulsion of polyisocyanates and a release agent obtained by reacting a polyisocyanate with an oxyalkylic hemiester of a $C_9$–$C_{18}$, saturated or unsaturated, monocarboxylic fatty acid.

18 Claims, No Drawings

BINDING COMPOSITIONS FOR THE MANUFACTURE OF LIGNOCELLULOSIC

This is a continuation, of U.S. application Ser. No. 07/586,805, filed Sep. 24, 1990, now abandoned which is incorporated by reference therein.

FIELD OF THE INVENTION

The present invention relates to binding compositions for essentially lignocellulosic composites and to the preparation process thereof.

More particularly the present invention relates to compositions containing polyisocyanates, in aqueous emulsion, to be used as binding agents for cellulosic materials, preferably lignocellulosic materials, such as wood, bark, bagasse, straw, bamboo, rice chaff, etc., in form of granules, chips, fibers, etc., in the manufacture of particle boards or other analogous composite materials, free of adhesion phenomena to pressing plates during the moulding step.

BACKGROUND OF THE INVENTION

It is known to use polyisocyanates, preferably in form of aqueous emulsions, to bind composites of lignocellulosic materials, as described, for instance, in the European Patent Application 13 112 or in Italian Patent Application 20027 A/88.

It is also known that the preparation of these composites requires a moulding operation on suitable presses between two heated metal plates.

During moulding, the polyisocyanic binder gives, as well known, in the absence of suitable interventions, adhesion phenomena of the manufactured articles to the plates of the press, causing process difficulties.

To overcome this drawback, different solutions have been suggested.

For instance, the use of polyisocyanates together with compounds, such as metal salts of carboxylic acids able to catalyze the formation of isocyanurates from isocyanates, has been described in the U.S. Pat. No. 3,870,665.

Another possibility, illustrated in the most part of the patent literature, consists in using "release agents", that is additives specifically intended to favour the release of the manufactured articles from the metal plates of the press.

In particular: Canadian Patent 1,123,817 suggests the use of phosphates to be added to the polyisocyanic emulsion, whereas Canadian Patent 1,176,778 suggests the use of a polyisocyanic emulsion containing paraffines and salts of higher fatty acids.

German Patent Application 2,921,726 suggests the addition of $C_9$-$C_{18}$ alkylbenzenesulfonic acids to the polyisocyanic emulsion.

German Patent Application 3,108,537 suggests the use of esters of orthophosphoric acid, and the European Patent Application 46 014 suggests the use of particular waxes having a melting point lower than 70° C., to be dispersed in the aqueous emulsion or to be applied before or after the binding agent.

U.S. Pat. No. 4,257,996 suggests the use of special phosphates or thiophosphates, to be separately added either in the polyisocyanic emulsion or in the polyisocyanate before emulsifying it, and U.S. Pat. No. 4,100,328 suggests the use of a binding agent containing a polyisocyanate mixed with a polyether polyol, having a functionality higher than 2, in the ratio from 0.5:1 to 1:1.

Finally, U.S. Pat. No. 4,490,518 suggests the use of 2-60% of diesters of bicarboxylic acids mixed with the polyisocyanate.

Concerning the modalities for the addition of the release agent, the following addition possibility are reported in the above mentioned patent documents: addition to the polyisocyanate, before or after the emulsifying operation ("inner" addition), or directly on the lignocellulosic material or on the plates of the press ("outside" addition).

It is known that the inner addition of the release agent generally causes a decay of the physico-mechanical properties of the composites obtained, and the outside addition involves working difficulties on the industrial plants.

A solution which overcomes the drawbacks of the prior art has been suggested in the European Patent Application 173,866, wherein the use is described of a binding system containing polyisocyanates not dispersed in water combined with release agents, consisting of the reaction product of a fatty acid containing a high number of C atoms with a compound having at least two reactive hydrogen atoms, such as alcohols and amines.

However, the solution suggested in this patent application is not free of drawbacks in that the advantages relating to the use of the aqueous emulsion are lacking.

These advantages, explained in German Patent Application 2,538,999 and in the European Patent Application 7,532 can be summarized as follows:

better distribution of the binding agent on the chip and therefore better technologic properties of the panel;

possibility to clean the apparatus with water;

possibility of working with chips having a variable moisture content.

DESCRIPTION OF THE INVENTION

The Applicant has now found a class of release agents never described in the literature allowing to overcome the drawbacks of the prior art and to use polyisocyanates dispersed in water.

Therefore, object of the present invention are the binding compositions for the preparation of lignocellulosic composites comprising an aqueous emulsion of polyisocyanates and a release agent consisting of at least a modified polyisocyanates having the general formula:

$$RO(R')_n CONX \qquad (I)$$

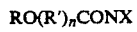

wherein
R represents the residue of a C9-C18, saturated or unsaturated, monocarboxylic fatty acid;
R' represents an oxy(iso)alkylic group containing from 2 to 4 C atoms;
X represents the residue of a polyisocyanate; and
n is an integer comprised between 4 and 35.

Polyisocyanates used both in the aqueous emulsion and in the preparation of the release agent are organic compounds having a low, medium and/or high molecular weight and contain at least two NCO groups.

Examples of polyisocyanates having a low molecular weight are those of the general formula:

$$OCN-R''-NCO \qquad (II)$$

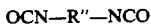

wherein R" represents an alkyl, cycloalkyl, aryl, alkylaryl radical containing from 1 to 25 C atoms, such as meta and/or para-phenylenediisocyanate, 2,4- toluenediisocyanate alone or mixed with the 2,6-toluenediisocyanate isomer, 4,4'-diphenylmethanediisocyanate, hexamethylenediisocyanate, 4,4'-dicyclohexyl-methane-diisocyanate, 1-isocyanate-3-isocyanate-methyl-3,5,5-trimethyl-cyclohexane (or isophoronediisocyanate), 2,2,4-trimethylhexamethylenediisocyanate mixed with the 2,2,4-trimethylhexamethylenediisocyanate isomer, etc.

Examples of medium- or high-molecular weight polyisocyanates are those having a different condensation degree which can be obtained by the phosgenation of aniline-formaldehyde condensation products.

These products are consisting of mixtures of polymethylenepolyphenylpolyisocyanates of the general formula:

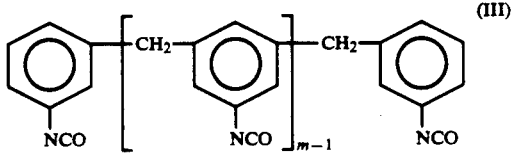

(III)

wherein m represents an integer higher than or equal to 1.

Particularly preferred polyisocyanates are the mixtures of polymethylenepolyphenylpolyisocyanates having an average functionality from 2.6 to 2.8; said products are put on the market under different names, such as "Tedimon 31" of Montedipe "PaPi" of Upjohn "Mondur MR" of Mobay and "Desmodur 44V20" of Bayer.

Aqueous emulsions of polyisocyanates can be obtained by known techniques, for instance those described in UK Patent 1,444,933 or in European Patent Application 13 112 or in Italian Patent Application 20 027 A/88.

Preferred emulsions are those described in the last above mentioned patent application to which is here wholly referred. These emulsions contain at least one cellulose derivative dissolved in water and at least one polyisocyanate.

The cellulose derivative is dissolved in water, at room temperature, in an amount equal to 0.1-10% b.w. on the total, preferably in an amount from 0.5 to 5% with mechanical stirring.

Cellulose derivatives particularly useful to obtain these emulsions are the water soluble cellulose ethers described in Kirk-Othmer "Encyclopaedia of Chemical Technology", 2nd Edition, vol. 4, page 616; examples of these products are the carboxymethylcelluloses, carboxymethylhydroxyethylcelluloses, hydroxyethylcelluloses, methylcelluloses, methylethylcelluloses, methylhydroxyethylcelluloses, etc.

Particularly preferred cellulose ethers are carboxymethylcellulose and carboxymethylhydroxyethylcelluloses.

More preferred ethers are carboxymethylcelluloses having a substitution degree higher than 0.5, generally about 0.8, the viscosity of the 2% water solution, measured by means of a Hoeppler viscosimeter at 20° C., being comprised between 10 and 45,000 m Pa.s and the pH being lower than 8, generally comprised between 6 and 8.

To the aqueous solution of the cellulose derivatives the polyisocyanate is added under stirring at room temperature and the system is then kept under high stirring speed, for instance at a speed higher than 8,000 rpm, for short periods of time, generally comprised between 5 and 60 seconds.

The polyisocyanate, optionally already added with the release agent, can be added to the solution in a quantity higher than 5% b.w., calculated on the total of the finished emulsion; however, it is preferable to add it in amounts comprised between 5 and 60% b.w.

The release agent of the general formula (I) can be obtained by allowing a polyisocyanate as above defined, even of the same type as that used in the aqueous emulsion, to react with an oxo(iso)alkylhemiester of a $C_9$-$C_{18}$, saturated or unsaturated, monocarboxylic fatty acid.

The reaction is carried out at 50°-80° C., with ratios between the polyisocyanate and the hemiester corresponding in equivalents to 2 or only a little higher than 2.

The release agent thus obtained is added under stirring to the polyisocyanic emulsion in quantity higher than 10% b.w;, calculated on the polyisocyanate, preferably in a quantity between 10 and 35% b.w.

When the polyisocyanate used for the release agent is of the same type as that used in the aqueous emulsion, it is possible to allow the hemiester to directly react with the polyisocyanic mass to be dispersed in water.

Oxy(iso)alkyl hemiesters used for preparing the release agent are obtained, according to known techniques, by esterification of the fatty acid with polyols having a hydroxylic functionality of at least 2 and an average molecular weight comprised between 200 and 4,000 or are available on the market under different trade names such as for instance PEG 200 Monoleate of Akzo.

Examples of monocarboxylic fatty acids are the lauric acid, the palmitic acid, the oleic acid, the linoleic acid, the linolenic acid, the stearic acid, etc.

Examples of polyols are the polyoxyethyleneglycols, polyoxypropyleneglycols, etc.

A process for the preparation of binding compositions of the present invention comprises the preparation of a mixture consisting of the polyisocyanate and the release agent and thereafter its dispersion in water according to known techniques, for instance that described in the Italian Patent Application 20 027 A/88.

An alternative process foresees the dispersion of the release agent in a polyisocyanic aqueous emulsion already available and prepared according to known techniques, for instance that described in the above mentioned Italian Patent Application.

Emulsions obtained according to the present invention can be advantageously used as binders of cellulosic materials, preferably lignocellulosic materials, such as wood, bark, bagasse, straw, bamboo, rice chaff etc., in form of granulated products, chips, fibers or meals and more generally in the manufacture of particle boards or other composities such as plywoods, fibre boards, blockboards, etc., without any problems for the industrial operator.

These compositions are added to the lignocellulosic material in a quantity comprised between 2 and 50% b.w. (calculated on the chip), preferably between 7 and 25% b.w.

These compositions allow a good release of the manufactured articles from the plates of the press. According to the use the plates, before starting a molding cycle, are treated with a flushing agent generally available on the market, such as for instance Trennmittel 4120 of ACMOS-Bremen (Federal Republic of Germany).

A good release of the manufactured articles from the plates of the press has been observed also by using mixtures of modified and unmodified polyisocyanate emulsions, provided that the quantity of the release agent in the total mixture is kept within the above mentioned ranges.

The following examples are given to illustrate the invention more in detail; however, the invention is not limited to the examples reported.

EXAMPLE 1

(Preparation of Hemiesters of Fatty Acids)

1a. Into a 1.5 liters glass reactor, provided with thermometer, agitator, cooler and collecting-separation-recycling column for the distillate, 538 g of stearic acid, 400 g of polyoxypropyleneglycol having molecular weight 425 (Polyurax PPG 425 of BP), 8 g of para-toluenesulfonic acid and 100 g of methylisobutylketone are introduced. The mixture is heated to 160° C. and is allowed to react for 120 minutes. The methylisobutylketone is removed by distillation in vacuo, is cooled at room temperature and discharged.

1b. The operation is carried out as in 1a., except that 200 g of stearic acid and 650 g of polyoxypropyleneglycol having molecular weight 1000 (Polyurax PPG 1025 of BP) are used.

1c. The operation is carried out as in 1a., except that 120 g of stearic acid and 770 g of polyoxypropyleneglycol having molecular weight 2000 (Polyurax 2025 of BP) are used.

1d. The operation is carried out as in 1a., except that 400 g of oleic acid and 542 g of polyoxypropyleneglycol having molecular weight 425 (Polyurax PPG 425 of BP) are used.

1e. The operation is carried out as in 1a., except that 300 g of lauric acid and 576 g of polyoxypropyleneglycol having molecular weight 425 (Polyurax 425 of BP) are used. The properties of the products prepared as described above are reported in Table 1.

TABLE 1

| PRODUCT | ACIDITY NUMBER (mg KOH/g) | HYDROXYL NUMBER (mg KOH/g) |
| --- | --- | --- |
| 1a | 4.4 | 67.4 |
| 1b | 5.0 | 31.5 |
| 1c | 4.7 | 12.1 |
| 1d | 3.4 | 74.0 |
| 1e | 4.0 | 78.5 |

EXAMPLE 2

(Preparation of mixtures of polyisocyanates and release agents)

2a. Into a 1.5 liters glass reactor, provided with agitator, cooler and heating braiding, are introduced 300 g of polymethylenepolyphenylpolyisocyanate (Tedimon 31 of Montedipe) and 128 g of modified toluenediisocyanate (TDI) hereinafter better defined.

The whole is mixed at 80° C. for 10 minutes under nitrogen stream. A product is obtained having a content of free NCO equal to 23.6%.

The modified TDI, having a content of free NCO equal to 4.9%, is obtained by reacting 25.1 g of TDI and 102.8 g of hemiester of the example 1a, for 6 hours at 80° C., in the presence of 0.1 g of benzoyl chloride.

2b. The operation is carried out as in 2a., except that 135 g of modified methanediphenyldiisocyanate (MDI), hereinafter better defined, are used.

A product is obtained having a content of free NCO groups equal to 23.2%.

The modified MDI, having a content of free NCO groups equal to 4.4%, is obtained by reacting 35.1 g of MDI, 99.8 g of hemiester of the example 1a. and 0.1 g of benzoyl chloride for 6 hours at 80° C.

2c. Into the reactor described in the example 2a. are introduced 600 g of Tedimon 31 and the whole is heated to 70° C. under stirring and, under nitrogen stream, 200 g of the hemiester of the example 1a. are added together with 0.4 g of benzoyl chloride.

The mixture is allowed to react at 80° C. for 90 minutes and thereafter it is cooled to room temperature and discharged. A product is obtained having a content of free NCO groups equal to 20-21%.

2d. The operation is carried out as in 2c., except that 200 g of hemiester of the example 1b., are used.

A product is obtained having a content of free NCO groups equal to 22.7%.

2e. The operation is carried out as in 2c., except that 200 g of hemiester of the example 1c are used.

A product is obtained having a content of free NCO groups equal to 22.6%.

2f. The operation is carried out as in 2c., except that 200 g of hemiester of the example 1d are used A product is obtained having a content of free NCO groups equal to 21.9%.

2g. The operation is carried out as in 2c., except that 200 g of hemiester of the example 1e are used.

A product is obtained having a content of free NCO groups equal to 21.2%.

2h. The operation is carried out as in 2c., except that 200 g of hemiester consisting of polyoxyethyleneglycol monooleate, having molecular weight 200 (PEG 200 Monooleate of Akzo) are used.

A product is obtained having a content of free NCO groups equal to 21.5%.

EXAMPLE 3

(Emulsifying of Mixtures of Polyisocyanates and Release Agent)

Into a 1 liter beaker there is introduced a 1.18% carboxymethylcellulose (CMC) aqueous solution the substitution degree of which is 0.82, the Hoeppler viscosity of the 2% aqueous solution measured at 20° C. being 100 mPa.s and the pH 6.4; thereafter, under stirring, the autoreleasing polyisocyanate of the examples from 2a to 2h is added. the quantities are reported in Table 2.

Thereafter a treatment is carried out at high speed (about 10,000 rpm) for 10-20 seconds by means of a turboagitator Ultra Turrax T 50 having emulsifying head T 45N, manufactured by Janke & Kunkel of Staufen in Breisgau (Federal Republic of Germany).

The content of free NCO groups of the obtained emulsions is from 8 to 8.5%, the viscosity measured at 20° C. at the Ford cup having a 4 mm hole, being about 20 seconds.

TABLE 2

| EMULSIONS | AUTORELEASING POLYISOCYANATE | | CMC SOLUTION (g) |
| --- | --- | --- | --- |
| | Type(name of the example) | Quantity (g) | |
| 3a | 2a | 185 | 315 |
| 3b | 2b | 185 | 315 |

TABLE 2-continued

| EMULSIONS | AUTORELEASING POLYISOCYANATE | | CMC SOLUTION (g) |
|---|---|---|---|
| | Type(name of the example) | Quantity (g) | |
| 3c | 2c | 200 | 300 |
| 3d | 2d | 190 | 310 |
| 3e | 2e | 190 | 310 |
| 3f | 2f | 200 | 300 |
| 3g | 2g | 200 | 300 |
| 3h | 2h | 200 | 300 |

EXAMPLE 4

(Emulsifying of unmodified polyisocyanate)

The operation is carried out as in example 3, except that 200 g of Tedimon 31 and 300 g of CMC solution are used.

An emulsion is obtained, the content of free NCO groups of which is 11.5%, the viscosity, measured as in the preceding example 3, being 30 seconds.

EXAMPLE 5

(Moulding of Particle Boards on a Laboratorium Press)

5a. Into a resin-applying machine are introduced 150 g of wood chips of the type industrially used for the external layers of particle boards and having a 5–6% moisture content and are treated, by means of suitable sprayers, with 40 g of an autoreleasing polyisocyanic emulsion (emulsions of examples from 3a. to 3h.).

125 g of the thus obtained chips are introduced in a 120×120 mm mould between two steel plates having the same surface and are moulded at 175° C. for times of 25 s/mm thickness.

The moulding operations have been repeated until 35 times, without any adhesion phenomena of the manufactured articles to the steel plates.

5b. The operation is carried out as in 5a., except that 40 g of polyisocyanic emulsion, obtained by mixing 53 pp of autoreleasing polyisocyanic emulsion (examples from 3a. to 3h.) with 47 pp of without releasing agent polyisocyanic emulsion (example 4) are used.

In this case also the moulding operations have been repeated many times using the same plates and no adhesion phenomena of the manufactured article have been observed.

EXAMPLE 6

MOULDING OF PARTICLE BOARDS ON A PILOT PRESS

A. 3000 g of wood chips, of the type industrially used for the external layers of particle boards and having a 5–6% moisture content are introduced into a pilot resin-applying machine and treated, by means of suitable sprayers, with 800 g of autoreleasing polyisocyanic emulsion of the example 3c.

B. The operation is repeated using 3000 g of wood chips, of the type industrially used for the inner layer of particle boards and having a 5–6% moisture content. These chips are resinified with 450 g of the polyisocyanic emulsion of the example 4.

On the 550×550 mm plate which makes the support of the mattress a layer of 700 g of chips of point A is placed and then 1400 g of chips of the point B and again 700 g of chips of the point A.

The mattress is then placed in a press and moulded at 175° C. for 15 s/mm thickness.

The moulding operation has been repeated many times and no adhesion phenomena has been observed.

Particle boards obtained (16 mm thickness) were in agreement with the type V100 of DIN 68763.

We claim:

1. Binding compositions for the manufacture of lignocellulosic composites consisting essentially of an aqueous polyisocyanate emulsion and a release agent consisting of at least one modified polyisocyanate of the general formula:

$$RO(R')_nCONX \qquad (I)$$

wherein
R represents the residue of a $C_9$–$C_{18}$, saturated or unsaturated, monocarboxylic fatty acid;
R' represents an oxy(iso)alkylene group containing from 2 to 4 C atoms;
x represents the residue of a polyisocyanate; and
n is an integer from 4 to 35, wherein said release agent is in an amount of at least about 10% b.w. calculated on the basis of the polyisocyanate in said polyisocyanate emulsion.

2. Compositions according to claim 1, wherein polyisocyanates used both in the preparation of the aqueous emulsion and in the preparation of the release agent are organic compounds having a low, medium and/or high molecular weight and contain at least two NCO groups.

3. Compositions according to claim 2, wherein the release agent of the general formula (I) is obtained by reacting the polyisocyanate with an oxy(iso)alkylene hemiester of a $C_9$–$C_{18}$, saturated or unsaturated, monocarboxylic fatty acid.

4. Compositions according to claim 3, wherein the reaction is carried out at 50°–80° C., with equivalent ratios between the polyisocyanate and the hemiester equal to 2 or only a little higher than 2.

5. Compositions according to claim 2, wherein the low molecular weight polyisocyanate is a compound of the formula:

$$OCN-R''-NCO \qquad (II)$$

wherein R'' is alkyl, cycloalkyl, aryl or alkylaryl containing from 1 to 25 C atoms, and
wherein the medium and high molecular weight polyisocyanates are compounds of the formula:

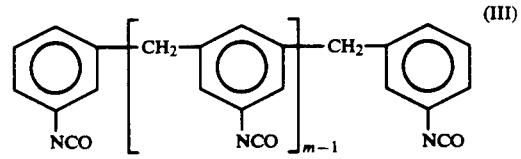

(III)

wherein m is an integer greater than or equal to 1.

6. Compositions according to claim 5, wherein the low molecular weight polyisocyanate is selected from the group consisting of para-phenylenediisocyanate, 2,4-toluenediisocyanate alone or mixed with 2,6-toluenediisocyanate, 4,4'-diphenyl-methyldiisocyanate, hexamethylenediisocyanate 4,4'-dicyclohexyl-methanediisocyanate, 1-isocyanate-3-isocyanatemethyl-3,5,5-trimethyl-cyclohexane, and an isomeric mixture of 2,2,4-trimethylhexamethylenediisocyanate; and wherein the medium or high molecular weight polyisocyanate is a polymethylenepolyphenylpolyisocyanate having an average functionality from 2.6 to 2.8.

7. Compositions according to claim 1, wherein the release agent is added to the emulsion in a quantity, calculated on the polyisocyanate, between 10 and 35% b.w.

8. Compositions according to claim 1, wherein when the polyisocyanate used for the release agent is of the same type as that used in the aqueous emulsion, the hemiester is allowed to react directly with the polyisocyanate mass to be dispersed in water.

9. A process for the preparation of the binding compositions for lignocellulosic composites of claim 1, which comprises preparing mixture consisting of a polyisocyanate and of the release agent and dispersing said mixture in water.

10. A process for the preparation of the binding compositions for lignocellulosic composites of claim 1, which comprises dispersing the release agent in the polyisocyanate emulsion.

11. A method for binding cellulosic material, comprising using as a binding agent the binding compositions of claim 1.

12. The method of claim 11, wherein the cellulosic material comprises a lignocellulosic material selected from the group consisting of wood, bark, bagasse, straw, bamboo, and rice chaff in the form of granules, chips, fibers or meals.

13. The method of claim 12, wherein the binding composition is added to the lignocellulosic material in an amount of about 2 to 50% b.w. based on the weight of said lignocellulosic material.

14. The method of claim 13, wherein the amount of said binding composition is about 7 to 25% b.w. based on the weight of said lignocellulosic material.

15. A method for manufacturing composites including particle boards, plywoods, fiber boards and blackboards, comprising molding bound cellulosic material made in accordance with claim 11.

16. A method for manufacturing composites including particle boards, plywoods, fiber boards and blackboards, comprising molding bound cellulosic material made in accordance with claim 12.

17. A method for manufacturing composites including particle boards, plywoods, fiber boards and blackboards, comprising molding bound cellulosic material made in accordance with claim 13.

18. A method for manufacturing composites including particle boards, plywoods, fiber boards and blackboards, comprising molding bound cellulosic material made in accordance with claim 14.

* * * * *

UNITED STATES PATENT AND TRADEMARK OFFICE
CERTIFICATE OF CORRECTION

PATENT NO. : 5,318,736

DATED : Jun. 7, 1994

INVENTOR(S): Agostino Lepori, Egidio Moroni

It is certified that error appears in the above-identified patent and that said Letters Patent is hereby corrected as shown below:

On Title Page, item 54, after "LIGNOCELLULOSIC" insert --COMPOSITES--.

Column 9, line 12: After "preparing" insert --a--.

Signed and Sealed this

Fourth Day of October, 1994

Attest:

BRUCE LEHMAN

Attesting Officer

Commissioner of Patents and Trademarks